United States Patent
Chu et al.

(10) Patent No.: US 10,510,125 B2
(45) Date of Patent: Dec. 17, 2019

(54) EXPENSE COMPLIANCE CHECKING BASED ON TRAJECTORY DETECTION

(71) Applicant: International Business Machines Corporation, Armonk, NY (US)

(72) Inventors: Stephen Chu, Beabercreek, OH (US); Min Gong, Shanghai (CN); Dong Sheng Li, Shanghai (CN); Jun Chi Yan, Shanghai (CN); Wei Peng Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 15/353,985

(22) Filed: Nov. 17, 2016

(65) Prior Publication Data
US 2018/0137576 A1    May 17, 2018

(51) Int. Cl.
*G06Q 40/00* (2012.01)
*G06Q 30/00* (2012.01)
*G06F 16/29* (2019.01)
*G06K 9/00* (2006.01)

(52) U.S. Cl.
CPC ............ *G06Q 40/12* (2013.12); *G06F 16/29* (2019.01); *G06K 9/00335* (2013.01); *G06K 9/00442* (2013.01); *G06Q 30/018* (2013.01)

(58) Field of Classification Search
USPC .................................. 705/30, 28; 455/456.1
See application file for complete search history.

(56) References Cited

U.S. PATENT DOCUMENTS

| | | | | |
|---|---|---|---|---|
| 5,708,423 A | * | 1/1998 | Ghaffari | G06K 17/0022 340/5.8 |
| 5,979,754 A | * | 11/1999 | Martin | G07C 9/00103 235/375 |
| 6,029,144 A | * | 2/2000 | Barrett | G06Q 99/00 235/375 |
| 6,226,622 B1 | * | 5/2001 | Dabbiere | G01S 5/0027 705/28 |
| 6,360,211 B1 | * | 3/2002 | Anderson | G06Q 20/102 705/30 |

(Continued)

OTHER PUBLICATIONS

Grenfell, A., "Employee expense reimbursements: Legitimate or fraudulent?", Feb.-Mar. 2015, http://www.mncpa.org/publications/footnote/2015-02/employee-expense-reimbursements-legitimate-or-fraudulent.aspx, pp. 1-4.

(Continued)

*Primary Examiner* — Andrew Joseph Rudy
(74) *Attorney, Agent, or Firm* — Fleit Intellectual Property Law; Thomas S. Grzesik

(57) ABSTRACT

A method, system, and computer program storage product determine determining a trajectory information type of a receipt submitted by an employee. Trajectory information associated with the receipt submitted by the employee is retrieved based on the trajectory information type. Trajectory information corresponding to a device associated with the employee is also retrieved. The receipt is determined as a valid receipt in response to the trajectory information associated with the receipt submitted by the employee matching the trajectory information associated with the device associated with the employee.

22 Claims, 3 Drawing Sheets

(56) References Cited

U.S. PATENT DOCUMENTS

| | | | | |
|---|---|---|---|---|
| 6,662,222 B2* | 12/2003 | Ishii | | H04L 41/00 709/224 |
| 7,286,158 B1* | 10/2007 | Griebenow | | G07C 9/00103 340/505 |
| 7,366,522 B2* | 4/2008 | Thomas | | H04W 8/10 455/456.1 |
| 7,385,479 B1* | 6/2008 | Green | | G06Q 10/00 340/286.02 |
| 7,720,702 B2* | 5/2010 | Fredericks | | G06Q 10/02 705/13 |
| 7,746,510 B2* | 6/2010 | Pandipati | | G06Q 40/00 358/474 |
| 7,779,384 B2* | 8/2010 | Lin | | G06F 8/35 715/763 |
| 8,115,633 B2* | 2/2012 | Puskala | | G06Q 10/08 235/382 |
| 8,271,228 B2* | 9/2012 | Kawabata | | A63F 13/10 702/168 |
| 8,442,766 B2* | 5/2013 | Nielsen | | G06Q 10/06 701/521 |
| 8,571,953 B2 | 10/2013 | Gopalakrishnan et al. | | |
| 8,583,462 B2* | 11/2013 | Podgurny | | G06Q 10/105 705/7.11 |
| 8,634,796 B2* | 1/2014 | Johnson | | H04W 4/02 455/404.1 |
| 8,880,417 B2* | 11/2014 | Hamper | | G06Q 40/12 705/5 |
| 8,897,741 B2* | 11/2014 | Johnson | | H04W 4/02 455/404.2 |
| 9,348,918 B2* | 5/2016 | Rose | | G06Q 30/02 |
| 9,400,959 B2* | 7/2016 | Ollenberger | | G06Q 10/025 |
| 9,402,273 B2* | 7/2016 | Farajidana | | H04W 52/0216 |
| 9,430,918 B2* | 8/2016 | Kelly, III | | G07G 5/00 |
| 9,477,887 B2* | 10/2016 | Kawaguchi | | G06K 9/00624 |
| 9,516,503 B2* | 12/2016 | Berns | | H04W 12/08 |
| 9,535,776 B2* | 1/2017 | Klose | | G06Q 10/06 |
| 9,779,384 B2* | 10/2017 | Fredericks | | G06Q 10/10 |
| 9,793,990 B2* | 10/2017 | Yamasaki | | H04B 10/1149 |
| 9,798,987 B2* | 10/2017 | Chapman | | G06Q 10/063114 |
| 9,842,312 B1* | 12/2017 | Rosati | | G06Q 10/063114 |
| 9,916,591 B2* | 3/2018 | Dione | | G06Q 30/02 |
| 9,916,606 B2* | 3/2018 | Stroh | | G06Q 30/04 |
| 9,922,325 B2* | 3/2018 | Boncimino | | G06Q 20/3224 |
| 9,930,494 B2* | 3/2018 | Liu | | H04W 4/04 |
| 10,019,686 B2* | 7/2018 | Hurst | | G06Q 10/0633 |
| 10,043,146 B2* | 8/2018 | Khatravath | | G06Q 10/06398 |
| 10,096,011 B2* | 10/2018 | Camp | | G06Q 50/12 |
| 10,097,441 B2* | 10/2018 | Lee | | G06Q 30/0201 |
| 10,123,751 B2* | 11/2018 | Petterson | | A61B 5/0022 |
| 10,210,482 B2* | 2/2019 | Smith | | G06Q 30/02 |
| 10,289,966 B2* | 5/2019 | Daher | | G06Q 10/02 |
| 10,311,530 B2* | 6/2019 | Becker | | G06Q 50/12 |
| 10,339,536 B2* | 7/2019 | Degeneffe | | G06Q 10/1091 |
| 2013/0211981 A1 | 8/2013 | Hamper | | |
| 2014/0105510 A1 | 4/2014 | Chelst et al. | | |
| 2014/0358743 A1 | 12/2014 | Marseille | | |
| 2016/0319642 A1* | 11/2016 | Ahmed | | E21B 41/0092 |
| 2017/0011410 A1* | 1/2017 | Oshima | | G06Q 30/02 |

OTHER PUBLICATIONS

Kim, J., et al., "Extracting Clinical Relations in Electronic Health Records Using Enriched Parse Trees", Procedia Computer Science, Dec. 31, 2015, pp. 1-10, vol. 53.

Yuwen, S., et al., "Standardizing the Medical Data in China", Journal of Convergence Information Technology, Aug. 2011, pp. 1-10, vol. 6, No. 8.

Singh, S., "Mobile Travel and Expense Management for SAP Users—Accelerate Receipt and Approvals to Drive Employee Satisfaction", http://www.innovapptive.com/blog/mobile-travel-and-expense-management-accelerate-receipt-and-approvals-to-drive-employee-satisfaction/, last visited on Oct. 31, 2016, pp. 1-8.

\* cited by examiner

EXPENSE COMPLIANCE CHECKING BASED ON TRAJECTORY DETECTION

BACKGROUND

The present disclosure generally relates to the expense compliance, and more specifically, to a method, system and a computer program product for performing expense compliance based on trajectory detection.

Employees may ask their employer to be reimbursed for business expenses they have personally paid for. Typically, the employer requires the employ to submit a receipt corresponding to the personal expense, and pays the reimbursement based on the amount recorded in the receipt. However, without an appropriate mechanism there may be employees that apply for reimbursement with invalid receipts. Here, "invalid" means although the receipt per se is not fake, it does not correspond to a personal expense for business purpose. For example, a meal receipt submitted by the employee may not correspond to a meal taken by the employee during work hour, but to a meal taken by the employee during off-work hour. In another example, a transport receipt submitted by the employee may not correspond to a transport taken by the employee, but to a transport taken by a relative of the employee. Manual determination of the validation of the receipt submitted by the employee requires a great amount of effort. It is therefore desirable for a new mechanism to determine the validation of the receipt submitted by the employee, i.e. to determine whether the receipt corresponds to a personal expense for the purpose of business.

SUMMARY

In general, example embodiments of the present disclosure include a method, device and computer program product for determining validity of receipts.

In one embodiment, a computer-implemented method is provided. In this embodiment, a trajectory information type of a receipt submitted by an employee is determined, and the trajectory information associated with the receipt submitted by the employee is retrieved. Trajectory information associated with a device assigned to the employee is also retrieved. The trajectory information associated with the receipt submitted by the employee and the trajectory information associated with the device assigned to the employee are compared, and if they match each other, the receipt is deemed as a valid receipt.

In another embodiment, a system is provided. The system comprises a processing unit and a tangible storage medium having instructions stored thereon for execution by the processing unit. The instructions, when executed by the processing unit, cause the processing unit to perform actions of: determining a trajectory information type of a receipt submitted by an employee; retrieving, according to the trajectory information type, the trajectory information associated with the receipt submitted by the employee; retrieving trajectory information associated with a device assigned to the employee; and determining the receipt as a valid receipt in response to that the trajectory information associated with the receipt submitted by the employee matches the trajectory information associated with the device assigned to the employee.

In yet another embodiment, a computer program product is provided. The computer program product comprises a computer readable storage medium having program instructions embodied therewith. The program instructions are executable by at least one processor, to cause the at least one processor to perform a method. The method comprises determining a trajectory information type of a receipt submitted by an employee; retrieve. The trajectory information associated with the receipt submitted by the employee is retrieved. Trajectory information associated with a device assigned to the employee is also retrieved. The trajectory information associated with the receipt submitted by the employee and the trajectory information associated with the device assigned to the employee are compared, and if they match each other, the receipt is deemed as a valid receipt.

In still another embodiment, a computer-implemented system is provided. The system comprises: a device information record unit configured to record the mapping relationship between a device and an employee; a device trajectory retrieving unit configured to retrieve the trajectory information associated with the device; a receipt information record unit configured to record the relationship between a receipt and the employee; a receipt trajectory retrieving unit configured to retrieve the trajectory information associated with the receipt; and a device-receipt matching unit configured to compare the trajectory information associated with the device corresponding to the employee and the trajectory information associated with the receipt corresponding to the employee, so as to determine the validity of the receipt.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

As used herein, the term "includes" and its variants are to be read as opened terms that mean "includes, but is not limited to". The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
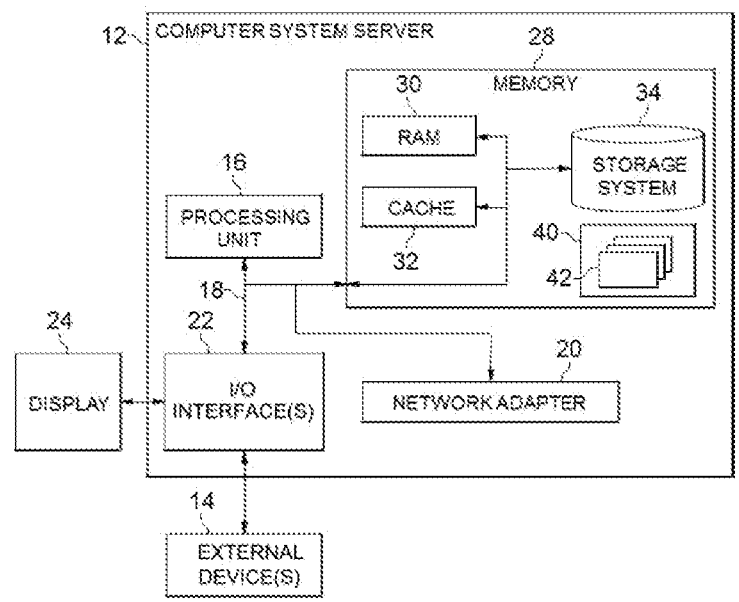
FIG. 1 is a block diagram of an electronic device according to one embodiment of the present disclosure.

Referring to FIG. 1, one example of an electronic device or computer system/server 12 is shown. The computer system/server 12 is applicable to implement one or more embodiments of the present disclosure. Computer system/server 12 is only illustrative and is not intended to suggest any limitation as to the scope of use or functionality of embodiments of the disclosure described herein. In some embodiments, the computer system/server 12 is a general-purpose computing device. In other embodiment, the computer system/server 12 is not a general-purpose computing device, but comprises specialized hardware, software, and/or circuitry specific to performing one or more embodiments of the present disclosure. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Computer system/server 12, in one embodiment, includes a variety of computer system readable media. Such media may be any available media that is accessible by computer system/server 12, and it includes both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and discussed below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

In computer system/server 12, I/O interfaces 22 may support one or more of various different input devices that can be used to provide input to computer system/server 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

To avoid reimbursement for invalid receipt, there is one solution called "pre-approval". If an employee plans to take a personal expense for business purpose, the employee submits a plan in a related information processing system before hand to obtain a pre-approval. The pre-approved personal expense will be recorded in the information processing system. After the expense occurs, the receipt corresponding to the expense is submitted to the information processing system. The reimbursement process will be initiated only when the receipt matches the pre-approval record. An invalid receipt cannot be matched with a pre-approval record in the information processing system and, therefore, cannot initiate the reimbursement process. This solution may somehow avoid reimbursement for invalid receipt, but the pre-approval takes a large amount of time. For some unexpected expenses such as local transport, it is infeasible to get a pre-approval. Therefore, reimbursement for such expense will be blocked.

There is another solution referred to a "cap". The employer sets a reimbursement cap for the employee such as the maximum amount of reimbursement for a single day. This solution may not need determination of the validity of the receipt. However, determination of the cap will need complex analysis. On one hand, if this cap is set to be excessively high then the cost of the employer will be unnecessarily increased since the employ will typically request reimbursement for an amount close to the cap. On the other hand, if this cap is set to be excessively low the reasonable personal expense for business purpose cannot receive reimbursement. In addition, the cap needs to be adjusted frequently according to the actual situation. For example, during a given time interval, the average meal expense and/or transport expense of a region will vary significantly. All these further increase the complexity of the system.

Figure 2:
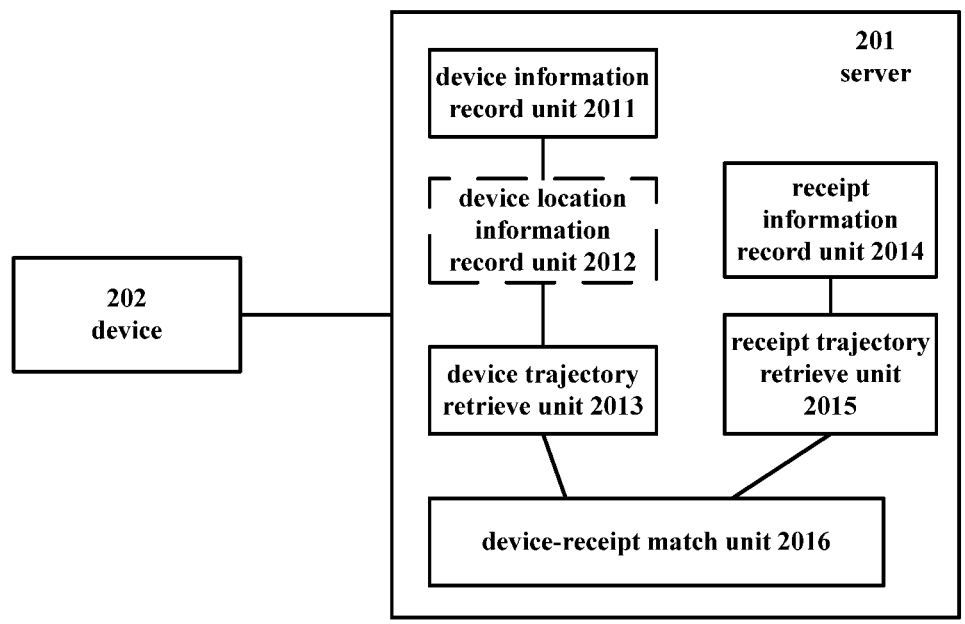
FIG. 2 shows a system for determining the validity of the receipt according to one embodiment of the present disclosure.

The solution according to one or more embodiments is discussed with reference to FIG. 2. In FIG. 2, the server 201 represents an information processing system for determining the validity of the receipt. The information processing system may be implemented on a computer such as the one illustrated in FIG. 1. Device 202 is a device designated to the employee such as a cell phone or other mobile devices of the employee. According to one embodiment, a mapping relationship between the device and the employee is recorded in the server. To be specific, the server records the mapping relationship between the identifier of the device and the identifier of the employee. For example, for a cell phone, at least one of the telephone number, ICCID code, MEID code, IMEI code, MAC address, Bluetooth address and so on can be used as the identifier of the cell phone. In one embodiment, a certificate may be installed on the device, and the serial number of the certificate can be used as the identifier. In one example, if the communication between the device and the server is encrypted, the encryption and/or decryption key allocated to the device can be used as the identifier of the device. Accordingly, the server includes a device information record unit 2011, which is configured to record the mapping relationship between the device and the employee.

The device 202 has the capability of retrieving the location information, and sending the location information to the server 201. In one embodiment, the device periodically (for example, every 5 minutes) sends its real-time location to the server. The device may also send its real-time location to the server in response to an operation on the device performed by the employee. In this case, the device may send associated time information to the server when it sends the location information. Alternatively, the device may send the location information only, and the server associates the receiving time of the location information with the location information.

In one embodiment, the device may also periodically (for example, every 5 minutes) record the location information of the device in a local memory, or record the location information of the device locally in response to a first operation on the device by the employee. The device may send the locally recorded location information as well as the associated time information to the server in response to a second operation on the device by the employee.

The function of reporting location information to the server, in one embodiment, may be enabled in response to an enabling operation, and be disabled in response to a disabling operation. For example, the employee may perform the enabling operation when he/she starts a personal expense for business purpose such as a meal or a transport. The employee may perform the disabling operation to stop the function after he/she finishes the meal or arrived at the destination. The employee may also enable that function only during work time.

It should be appreciated that no matter how the device sends the location information, the server may obtain a location-time sequence. Accordingly, the server may include a device location information record unit 2012 that is configured to record the location-time sequence. The server 201 may also include a device trajectory retrieving unit 2013 that is configured to retrieve, based on the location information sent by the device, the movement information of the device during a time interval, and/or, the stay information of the device during a time interval. In the context of this disclosure, the movement information and the stay information are collectively referred to as "trajectory information". Those skilled in the art will understand how to retrieve the trajectory information according to the location-time sequence. Alternatively, the device may send its trajectory information to the device trajectory retrieving unit 2013 directly. In this embodiment, the device location information record unit 2012 is no longer needed.

As discussed above, the server records the relationship between the identifier of the employee and the identifier of the device. In one or more embodiments, the employee may register multiple devices to the server, and the identifier of each of the registered devices may be mapped to the identifier of the employee. In other words, the location information of at least one of the devices may present the location of the employee. In one embodiment, the location information of the device is equivalent to the location information of the employee using that device.

After the employee submits the receipt to the server, the receipt may be stored associated with the identifier of the employee. Accordingly, the server may include a receipt information record unit 2014, which is configured to record the relationship between the receipt and the employee. The server may further include a receipt trajectory retrieving unit 2015. This trajectory retrieving unit is configured to retrieving the trajectory information related to the receipt. As mentioned above, the trajectory includes movement information and stay information. Some receipts may include movement information such as the starting location and ending location of a transport, and/or, the starting time and ending time of the transport, and/or, the length of the transport. Some receipts may include stay information such as the expense corresponding to that receipt may happen at a fixed location.

The server may further include a device-receipt matching unit 2016. According to the definition of the valid receipt, the receipt corresponds to a personal expense performed by the employee during the work time. In addition, the trajectory information of the employee is deemed as being identical to the trajectory information of the employee's device. The trajectory information of the device is consistent with the device of the trajectory information indicated by the receipt. The matching unit compares the trajectory information indicated by the receipt associated with the employee and the trajectory information of the device assigned to the employee, and accordingly determines the validity of the receipt. If the server finds any mismatch, the server sends an alert message to indicate that further investigation is needed.

Figure 3:
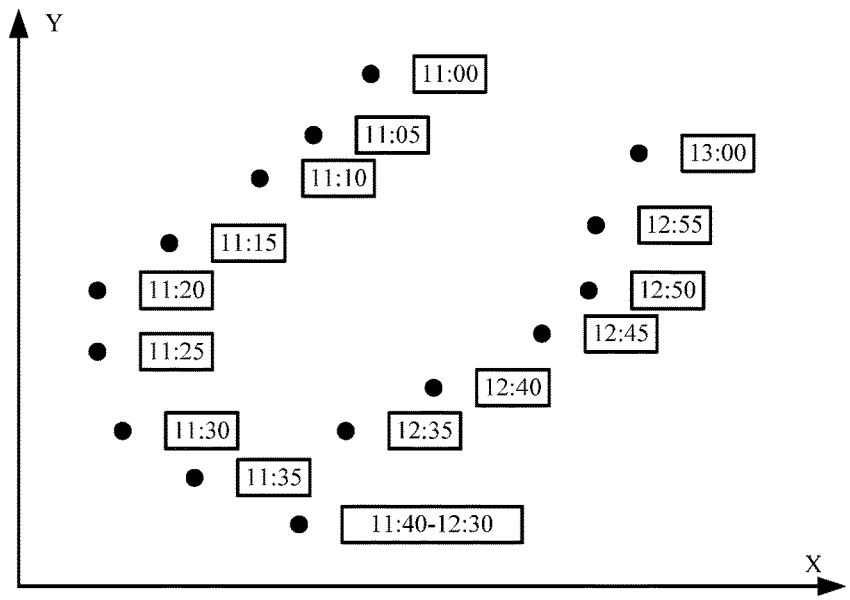
FIG. 3 shows location information according to according to one embodiment of the present disclosure.

The solution for determining the validity of the receipt according to embodiments of the invention will be described further with reference to FIG. 3. As shown in FIG. 3, X and Y represent coordinate axes. For example, X may represent the longitude while Y may represent the latitude. Each point represents a location in the coordinate system. The number to the right of the point represents the time when the device is at that location. FIG. 3 illustrates the locations of the device during 11:00 to 13:00. In this example, 11:00 to 13:00 is work time.

Those skilled in the art will understand that, FIG. 3 is an illustration of the device location information recorded by the device location information record unit 2012 in the server 201. In FIG. 3, from 11:00 to 11:40, the device moves, starting at (M1, N1), which is the location of the device at 11:00, and ending at (M2, N2), which is the location of the device at 11:40. From 11:40 to 12:30, the device stays at (M3, N3). From 12:30 to 13:00, the device moves again, starting at (M4, N4), which is the location of the device at 12:30, and ending at (M5, N5), which is the location of the device at 13:00. This trajectory information can be retrieved by the device trajectory retrieving unit 2013 as shown in FIG. 2.

Supposing that the employee associated with the device submits a receipt 1, a receipt 2 and a receipt 3. The receipt 1 is a meal receipt, which records the name of the beneficiary ZZZ, and the amount of the expense AAA. Receipt 2 is a transport receipt, which records the starting location (X1, Y1) and the ending location (X2, Y2), and the amount of the expense BBB. Receipt 3 is also a transport receipt, which records the starting time T1, and the ending time T2, and the amount of the expense CCC.

For receipt 1, the server 201 applies a match of stay information. The receipt trajectory retrieving unit 2015 obtains the location information of the beneficiary recorded in the receipt as the stay information corresponding to the receipt. For example, the location of the beneficiary may be obtained via an interface provided by map service provider. Suppose the location of the beneficiary ZZZ is (X0, Y0). If the device-receipt match unit 2016 determined that (M3, N3) matches (X0, Y0), the receipt 1 is deemed as a valid receipt. It should be understood that "match" does not necessarily mean "overlap"; it may also mean "be adjacent to". Those skilled in the art may use various technologies to determine whether two special points overlap or are adjacent to each other. If (M3, N3) does not match (X0, Y0), it may be determined that the employee does not stay at the location indicated by the receipt.

For receipt 2, the server 201 applies a match of movement information. The receipt trajectory retrieving unit 2015 obtains, based on the starting location and the ending location recorded in the receipt, a trajectory from (X1, Y1) to (X2, Y2) as the trajectory information of the receipt. If the device-receipt match unit 2016 determined that (M1, N1) matches (X1, Y1) plus (M2, N2) matches (X2, Y2), or that (M4, N4) matches (X1, Y1) plus (M5, N5) matches (X2, Y2), the receipt 1 is deemed as a valid receipt.

In one embodiment, the device-receipt match unit 2016 may further determine whether the route from (M1, N1) to (M2, N2) taken by the device is reasonable. In one example, as shown in FIG. 3, the route from (M1, N1) to (M2, N2) actually taken by the device may be obtained through the location information of the device. In another example, a theoretical route from (M1, N1) to (M2, N2) may be obtained by route planning algorithms. The route planning algorithm may consider the historical route from (M1, N1) to (M2, N2) to determine the theoretical route. If it is determined that the route actually taken by the device is not reasonable based on, for example, the theoretical router, an expected route, historical route data, etc., the device-receipt match unit 2016 determines the receipt as an invalid receipt.

For receipt 3, the server 201 also applies a match of movement information. If the device-receipt match unit 2016 determined that T1 matches 11:00 plus T2 matches 11:40, or that T1 matches 12:30 plus T2 matches 13:00, the receipt 3 is deemed as a valid receipt. Similarly, "match" does not necessarily mean 'overlap"; it may also mean "be adjacent to". Those skilled in the art may use various technologies to determine whether two time points overlap or are adjacent to each other.

Figure 4:
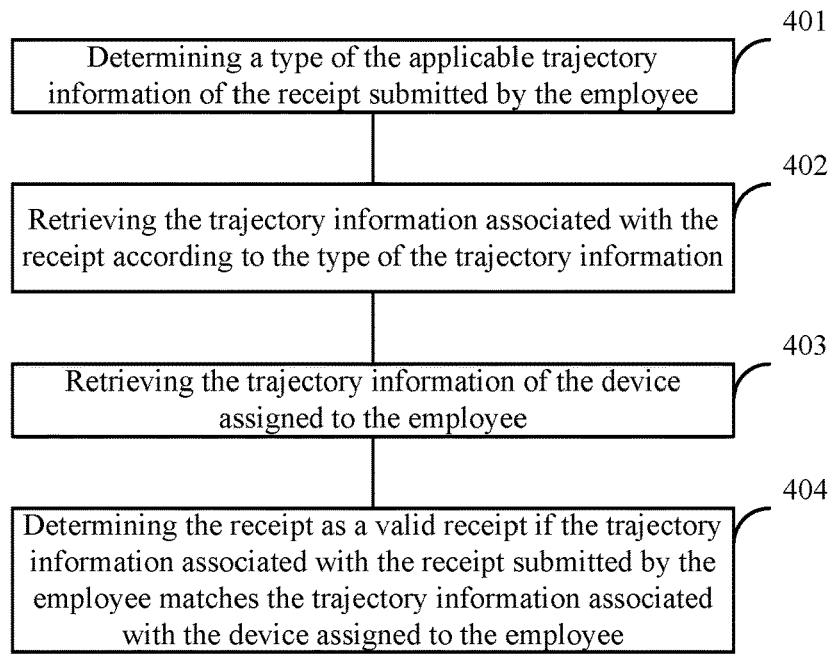
FIG. 4 shows a method of determining the validity of the receipt according to one embodiment of the present disclosure.

The method of determining the validity of the receipt according to embodiments of the invention will be further described with reference to FIG. 4. A type of the applicable trajectory information of the receipt submitted by the employee is determined at step 401. As discussed above, the trajectory information includes stay information and movement information. In one embodiment, whether stay information or movement information should be applicable is determined by recognizing keywords in the receipt. In one embodiment, if the employee submits a physical receipt, the physical receipt can be transformed to an electronic form through photography, scanning or manual processing. If an electronic receipt is available, the employee may also submit the electronic receipt.

For a receipt having the electronic form, the keywords included within the receipt are available for the entity performing this method. For example, in case of a manually processed receipt or an electronic receipt, the information regarding the receipt is structured information, and any information can be retrieved therefrom. For the electronic form of the physical receipt obtained through photography or scanning, which may be images, text recognition technology may be used to recognize the text therein and retrieve the keywords. The following discussion utilizes an example where the electronic form of the physical receipt is obtained through photography or scanning of the physical receipt.

After the keywords are retrieved, it is determined whether to use the stay information or to use the movement information, based on the retrieved keywords. In one embodiment, the keywords are only set for movement information. For example, "get on", "get off", "depart", "destination", and "distance" may be set as the keywords for movement information. If the retrieved keywords include these words, then movement information may be applicable; otherwise, stay information may be applicable.

In one embodiment, keywords may be set for both movement information and stay information. For example, get on", "get off", "depart", "arrive", and "distance" may be set as the keywords for movement information, while "restaurant", "food", "drink" may be set as the keywords for stay information. If the retrieved keywords include more movement information keywords than stay information key words, movement information may be applicable; otherwise stay information may be applicable.

The trajectory information associated with the receipt is retrieved according to the type of the trajectory information at step 402. If keywords such as "get on", "get off", "depart", "arrive", "distance" are detected, the type of trajectory information applicable for the receipt is movement information. Accordingly, the movement information may be retrieved from the receipt by leveraging these keywords. For example, the corresponding information typically follows the keywords in the receipt. Starting time information may follow the word "get on"; ending time information may follow the word "get off"; starting location information may follow the word 'depart"; ending location information may follow the word 'arrive". The starting time, the ending time, the starting location and the ending location may all be used as the movement information.

If the starting location and the ending location are represented by their coordinates, they can be used as the movement information directly. If the starting location and the ending location are represented by location names, the corresponding coordinates may be obtained via an interface provided by map service provider, and the obtained coordinates may be used as the movement information. If keywords such as "restaurant", "food", "drink" are detected, the type of trajectory information applicable for the receipt is stay information. Accordingly, the stay information may be retrieved from the receipt by leveraging these keywords. For example, the name of the beneficiary may be retrieved, and the corresponding coordinate may be obtained via an interface provided by map service provider, and the obtained coordinate may be used as the stay information.

The trajectory information of the device assigned to the employee is retrieved at step 403. In one embodiment, the type of the trajectory information of the device may be determined according to the type of the trajectory information of the receipt determined in step 401. If in step 401, the determined type of the trajectory information is stay information, then stay information of the device may be obtained in this step. If in step 401, the determined type of the trajectory information is movement information, then movement information of the device may be obtained in this step. The receipt is determined as a valid receipt, in step 404, if the trajectory information associated with the receipt submitted by the employee matches the trajectory information associated with the device assigned to the employee.

Figure 5:
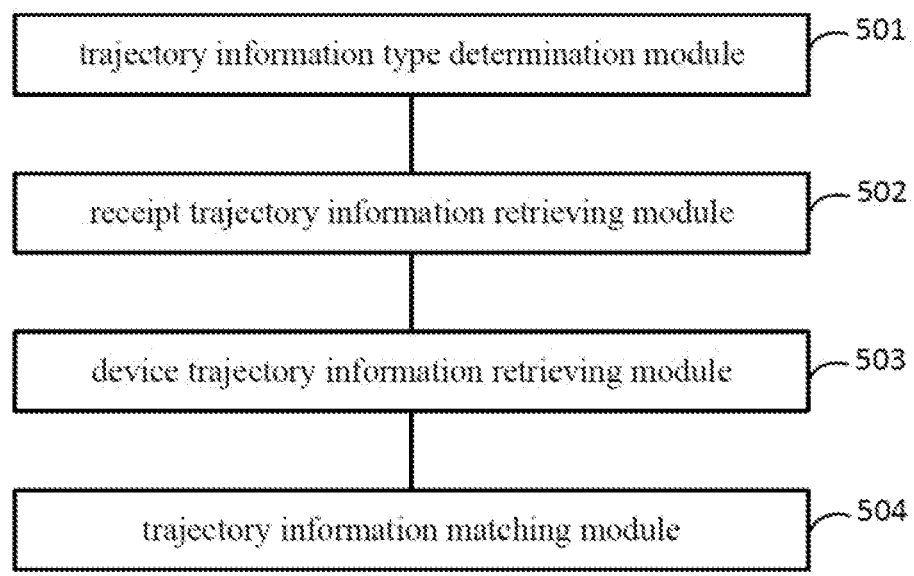
FIG. 5 shows a system of determining the validity of the receipt according to one embodiment of the present disclosure.

FIG. 5 is a block diagram of a system for determining the validity of the receipt according to one embodiment. The system includes a trajectory information type determination module 501, a receipt trajectory information retrieving module 502, a device trajectory information retrieving module 503; and a trajectory information matching module 504. The trajectory information type determination module 501 is configured to determine a trajectory information type of a receipt submitted by an employee. The receipt trajectory information retrieving module 502 is configured to retrieve, according to the trajectory information type, the trajectory information associated with the receipt submitted by the employee. The device trajectory information retrieving module 503 is configured to retrieve trajectory information associated with a device assigned to the employee. The trajectory information matching module 504 is configured to determine the receipt as a valid receipt in response to that the trajectory information associated with the receipt submitted by the employee matches the trajectory information associated with the device assigned to the employee.

The trajectory information type includes stay information and movement information, and determining a trajectory information type of a receipt submitted by an employee includes: determining whether stay information or movement information is applicable by recognizing the keywords in the receipt.

The system further includes a module configured to obtain an image of the receipt submitted by the employee and a module configured to recognize text in the image and retrieving the keywords.

Retrieving trajectory information associated with a device assigned to the employee includes obtaining, from the device assigned to the employee, a location-time sequence of the device; deducing the trajectory information from the location-time sequence.

Retrieving trajectory information associated with a device assigned to the employee includes retrieving, according to the determined trajectory information type of the receipt submitted by the employee, the trajectory information of the device assigned to the employee, which has the same type.

The system further includes a module configured to check whether a route taken by the device is reasonable; a module configured to determine the receipt as an invalid receipt in response to that the route taken by the device is not reasonable.

Checking whether a route taken by the device is reasonable includes retrieving, through route planning, a theoretical route corresponding to the movement information; determining whether the route taken by the device is reasonable by checking whether the theoretical route matches the route taken by the device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   determining a trajectory information type of a receipt submitted by an employee;
   retrieving, based on the trajectory information type, trajectory information associated with the receipt submitted by the employee;
   retrieving trajectory information corresponding to a device associated with the employee based on at least
      obtaining, from the device, one or more location-time sequences of the device, and
      deducing the trajectory information from at least one of the one or more location-time sequences; and
   determining the receipt is a valid receipt in response to the trajectory information associated with the receipt submitted by the employee matching the trajectory information associated with the device associated with the employee, wherein the receipt is reimbursable based on determining the receipt is a valid receipt.

2. The computer-implemented method of claim 1, wherein the trajectory information type comprises at least one of stay information and movement information.

3. The computer-implemented method of claim 1, wherein determining the trajectory information type of the receipt comprises:
   determining the trajectory information type by recognizing a set of keywords in the receipt.

4. The computer-implemented method of claim 3, wherein determining the trajectory information type of the receipt further comprises:
   obtaining an image of the receipt submitted by the employee; and
   recognizing text in the image; and
   extracting the set of keywords from the text.

5. The computer-implemented method of claim 1, wherein the trajectory information is movement information, and wherein the method further comprises:
   checking, based on the movement information, whether a route taken by the device is reasonable;
   determining the receipt as an invalid receipt in response to the route taken by the device being unreasonable.

6. The computer-implemented method of claim 1, wherein retrieving the trajectory information associated with the device comprises:
   retrieving, based on the determined trajectory information type of the receipt, the trajectory information of the device having a trajectory information type matching the trajectory information type of the receipt.

7. The computer-implemented method of claim 5, wherein checking whether a route taken by the device is reasonable comprises:
   retrieving, through route planning, a theoretical route corresponding to the movement information; and
   determining whether the route taken by the device is reasonable by checking whether the theoretical route matches the route taken by the device.

8. A system comprising:
a processing unit, wherein the processing unit:
determines a trajectory information type of a receipt submitted by an employee from a plurality of trajectory information types;
retrieves, based on the trajectory information type, trajectory information associated with the receipt submitted by the employee, wherein different trajectory information is obtained for different trajectory information types of the plurality of trajectory information types;
retrieves trajectory information corresponding to a device associated with the employee based on at least
obtaining, from the device, one or more location-time sequences of the device, and
deducing the trajectory information from at least one of the one or more location-time sequences; and
determines the receipt is a valid receipt in response to the trajectory information associated with the receipt submitted by the employee matching the trajectory information associated with the device associated with the employee, wherein the receipt is reimbursable based on determining the receipt is a valid receipt.

9. The system of claim 8, wherein the trajectory information is movement information, and wherein the method further comprises:
checking, based on the movement information, whether a route taken by the device is reasonable;
determining the receipt as an invalid receipt in response to the route taken by the device being unreasonable.

10. The system of claim 8, wherein the trajectory information type comprises at least one of stay information and movement information.

11. The system of claim 8, wherein determining the trajectory information type of the receipt comprises:
determining the trajectory information type by recognizing a set of keywords in the receipt.

12. The system of claim 11, wherein determining the trajectory information type of the receipt further comprises:
obtaining an image of the receipt submitted by the employee; and
recognizing text in the image; and
extracting the set of keywords from the text.

13. The system of claim 9, wherein checking whether a route taken by the device is reasonable comprises:
retrieving, through route planning, a theoretical route corresponding to the movement information; and
determining whether the route taken by the device is reasonable by checking whether the theoretical route matches the route taken by the device.

14. The system of claim 8, wherein retrieving the trajectory information associated with the device comprises:
retrieving, based on the determined trajectory information type of the receipt, the trajectory information of the device having a trajectory information type matching the trajectory information type of the receipt.

15. A computer program product comprising a computer readable storage medium having program instructions embodied therewith, the program instructions executable by at least one processor, to cause the at least one processor to perform a method comprising:
determining a trajectory information type of a receipt submitted by an employee;
retrieving, based on the trajectory information type, trajectory information associated with the receipt submitted by the employee;
retrieving trajectory information corresponding to a device associated with the employee based on at least
obtaining, from the device, one or more location-time sequences of the device, and
deducing the trajectory information from at least one of the one or more location-time sequences; and
determining the receipt is a valid receipt in response to the trajectory information associated with the receipt submitted by the employee matching the trajectory information associated with the device associated with the employee, wherein the receipt is reimbursable based on determining the receipt is a valid receipt.

16. The computer program product of claim 15, wherein the trajectory information is movement information, and wherein the method further comprises:
checking, based on the movement information, whether a route taken by the device is reasonable;
determining the receipt as an invalid receipt in response to the route taken by the device being unreasonable.

17. The computer program product of claim 16, wherein checking whether a route taken by the device is reasonable comprises:
retrieving, through route planning, a theoretical route corresponding to the movement information; and
determining whether the route taken by the device is reasonable by checking whether the theoretical route matches the route taken by the device.

18. The computer program product of claim 15, wherein the trajectory information type comprises at least one of stay information and movement information.

19. The computer program product of claim 15, wherein determining the trajectory information type of the receipt comprises:
determining the trajectory information type by recognizing a set of keywords in the receipt.

20. The computer program product of claim 19, wherein determining the trajectory information type of the receipt further comprises:
obtaining an image of the receipt submitted by the employee; and
recognizing text in the image; and
extracting the set of keywords from the text.

21. The computer program product of claim 15, wherein retrieving the trajectory information associated with the device comprises:
retrieving, based on the determined trajectory information type of the receipt, the trajectory information of the device having a trajectory information type matching the trajectory information type of the receipt.

22. A computer-implemented system, comprising:
a device information record unit configured to record a mapping relationship between a device and an employee;
a device trajectory retrieving unit configured to retrieve trajectory information associated with the device based on at least
obtaining, from the device, one or more location-time sequences of the device, and
deducing the trajectory information from at least one of the one or more location-time sequences; and
a receipt information record unit configured to record a relationship between a receipt and the employee;
a receipt trajectory retrieving unit configured to retrieve trajectory information associated with the receipt; and a device-receipt matching unit configured to perform a comparison of the trajectory information associated with the device corresponding to the employee and the trajectory information associated with the receipt corresponding to the employee, and determine a validity of the receipt based on the comparison wherein the device-receipt matching unit determines the receipt is a valid receipt in response to the trajectory information associated with the receipt matching the trajectory information associated with the device, wherein the receipt is reimbursable based on determining the receipt is a valid receipt.

* * * * *